United States Patent [19]

Riedel et al.

[11] Patent Number: 4,625,756
[45] Date of Patent: Dec. 2, 1986

[54] PILOT OPERATED RELIEF VALVE

[75] Inventors: Hans-Peter Riedel, Steinhausen; Josef Zürcher, Edlibach; Hubert Häussler, Neuheim, all of Switzerland

[73] Assignee: Beringer-Hydraulik GmbH, Neuheim, Switzerland

[21] Appl. No.: 573,965

[22] Filed: Jan. 26, 1984

[30] Foreign Application Priority Data

Jan. 26, 1983 [DE] Fed. Rep. of Germany ....... 3302434
May 17, 1983 [DE] Fed. Rep. of Germany ....... 3317879
Aug. 11, 1983 [DE] Fed. Rep. of Germany ....... 3328988

[51] Int. Cl.$^4$ .............................................. F16K 17/10
[52] U.S. Cl. ................................. 137/491; 137/492.5
[58] Field of Search ............... 137/491, 489, 493, 492, 137/492.5

[56] References Cited

U.S. PATENT DOCUMENTS 2,091,596 8/1937 Kluppel ................................. 137/491
2,835,266 5/1958 Morte ........................... 137/491 UX
3,923,075 12/1975 Farrell .................................. 137/491
4,364,410 12/1982 Chow .............................. 137/493 X

OTHER PUBLICATIONS

Grundlagen der Oelhydraulik, W. Backe, Fourth Edition, 1979, cover page and pp. 242–243.

*Primary Examiner*—Alan Cohan
*Attorney, Agent, or Firm*—Bell, Seltzer, Park & Gibson

[57] ABSTRACT

A pilot operated relief valve is disclosed which includes a first control space operatively connected to the inlet fluid channel, and a second control space operatively connected to the outlet fluid channel. In one embodiment, each control space is connected to a relief outlet by means of an ajustable valve, whereby the valve is adapted to operate as a pressure relief valve in either flow direction. In another embodiment, one of the control spaces is connected to the opposite channel by means of a one-way check valve, so as to function as a makeup fluid supply valve upon the pressure in the opposite channel reaching a predetermined low level.

3 Claims, 7 Drawing Figures

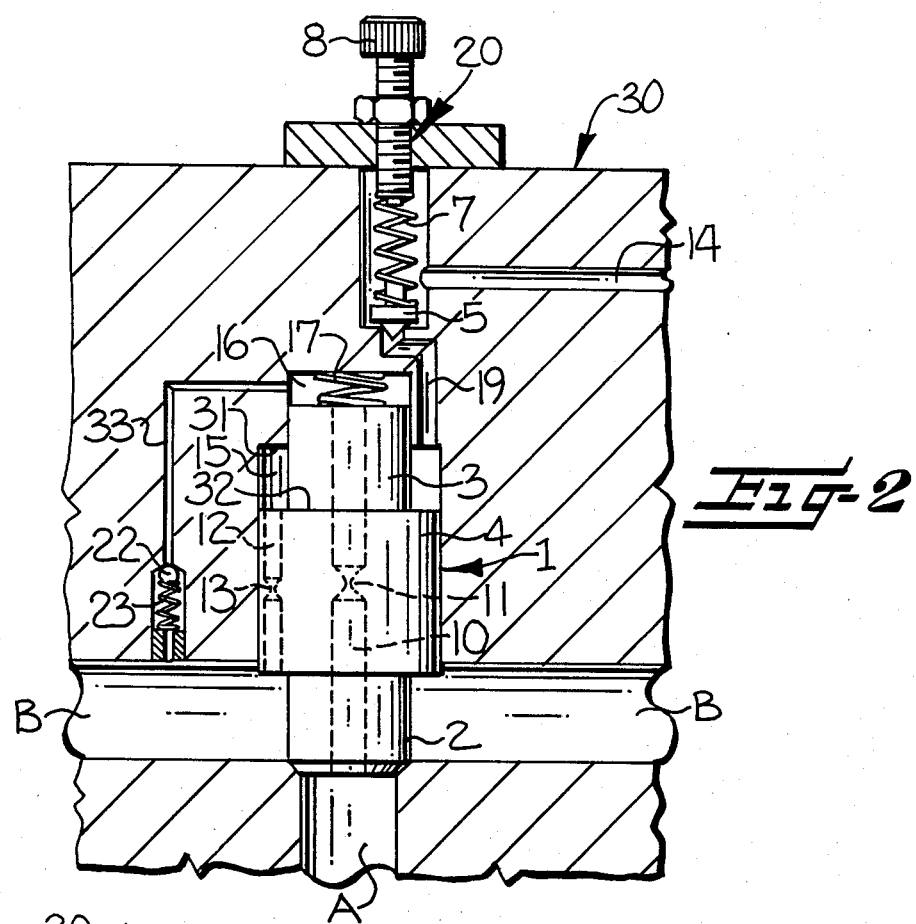
Fig-2
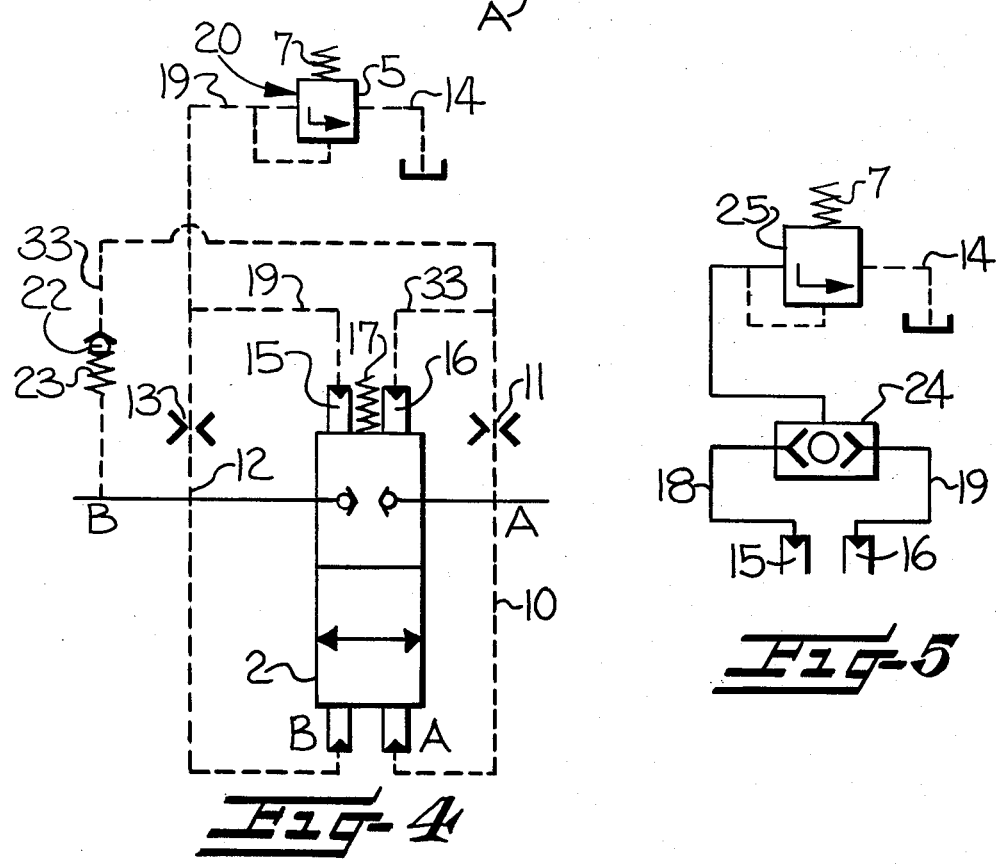
Fig-4
Fig-5

PILOT OPERATED RELIEF VALVE

The present invention relates to a pilot operated pressure relief valve adapted for controlling the flow of a hydraulic fluid or the like to a working device.

A known pilot operated relief valve is described in Backe, Grundlagen der Oelhydraulik, Fourth Edition, 1979, at page 243, and which includes a main control piston for controlling the connection between a pump and a reservoir. The main control piston moves in a pilot control cylinder and contains a longitudinal passage which connects the pump connection with a pilot control space. The pressure in the pilot control space is controlled by a directly operated, spring loaded preset valve.

In the case of reversely acting working devices, two such pilot operated pressure relief valves are required, one for each flow direction. For working devices which require a preset pressure, e.g. power shovels, cranes, etc., there is also required a makeup supply valve, in addition to the relief valve required for operation under a predetermined pressure. The additional makeup supply valve is required by the fact that upon reversal of the operating direction, the pressure cannot be permitted to fall below a predetermined level, such as atmospheric pressure, and the makeup supply valve is designed to provide a supply of the hydraulic fluid upon the line reaching unduly low pressure conditions.

It is accordingly an object of the present invention to provide a pilot operated relief valve which functions to maintain a predetermined pressure in each flow direction.

It is also an object of the present invention to provide a pilot operated relief valve which functions as a makeup supply valve for supplying the fluid to one of the working lines upon the pressure reaching a predetermined low level.

These and other objects and advantages of the present invention are achieved in the embodiments illustrated herein by the provision of a pilot operated relief valve which comprises a housing having a bore therein, and a first or inlet fluid channel and a second or outlet fluid channel each communicating with the bore. A piston is slideably mounted in the bore for movement between a closed position wherein communication between the first and second channels is closed and an open position wherein the piston permits such communication. The bore of the housing and the piston include opposing inner ends which define a first control space therebetween, and the bore and the piston also include opposing annular shoulders which define a second control space therebetween. A first fluid canal interconnects the first fluid channel with the first control space, and a second fluid canal interconnects the second fluid channel with the second control space. In addition, there is provided pressure release means operatively communicating with each of the first and second control spaces, for releasing the pressure in each of the spaces upon the pressure therein exceeding a predetermined amount.

In one preferred embodiment, the pressure release means comprises a pressure relief outlet, and a separate adjustable pressure operated relief valve disposed between each of the control spaces and the relief outlet, so as to permit independent adjustment of the release pressure. Also, in one preferred embodiment, the pressure release means further comprises a passageway extending between the first control space and the second channel, and one-way valve means disposed in the passageway for limiting flow to the direction from the first control space to the second channel upon a predetermined pressure difference being present therebetween. This latter construction thus permits a supply of fluid into the second channel upon the pressure in the second channel reaching an undesirable low level.

Some of the objects of the invention having been stated, other objects and advantages will appear as the description proceeds, when taken in connection with the accompanying drawings, in which —

FIG. 2 is a view similar to FIG. 1 and illustrating another embodiment of the invention;

FIG. 4 is a circuit diagram of a further embodiment of the invention;

FIG. 5 is a circuit diagram of a further embodiment of the pressure release valve means for the valve of the present invention;

Figure 1:
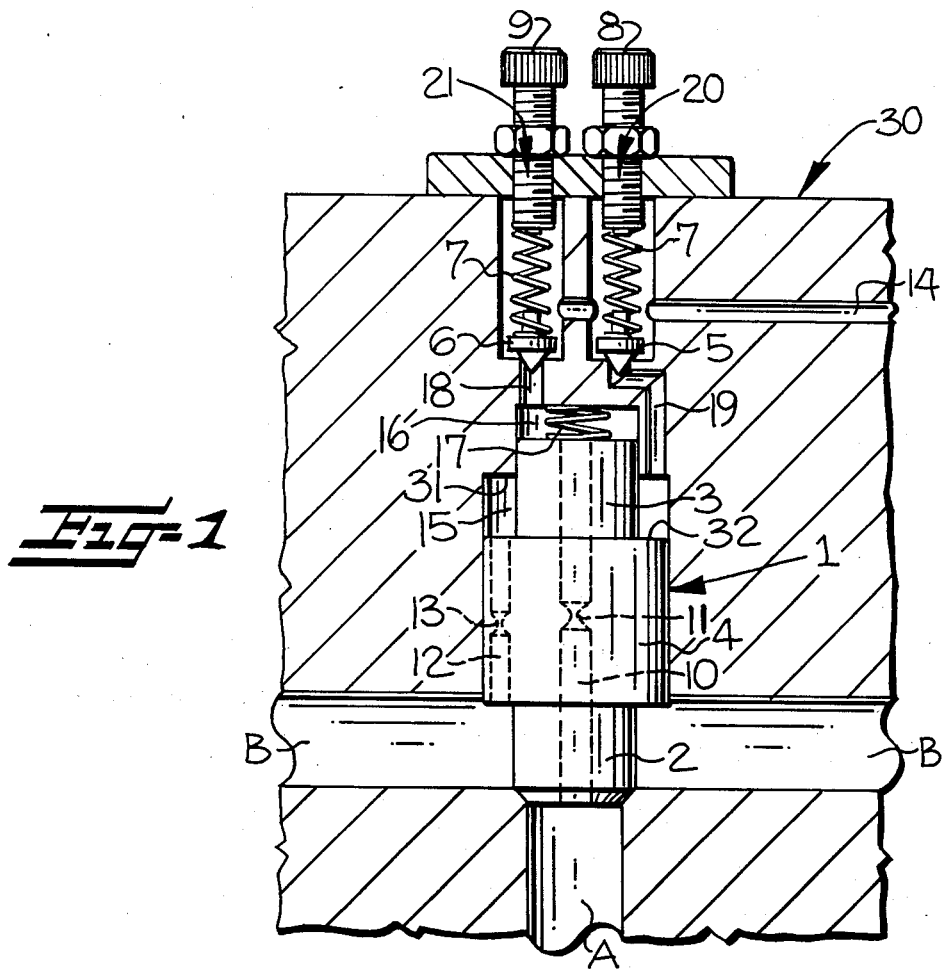
FIG. 1 is a somewhat schematic cross-sectional view of a reversely operable pilot operated relief valve which embodies the features of the present invention.
Figure 6:
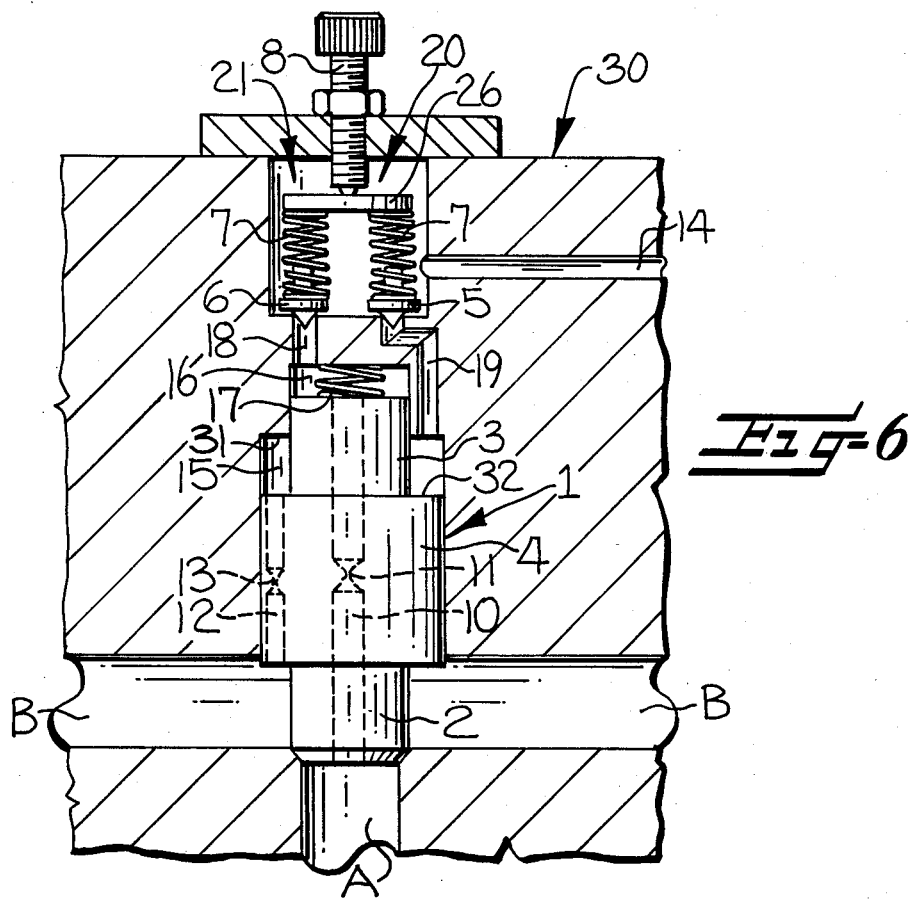
Figure 7:
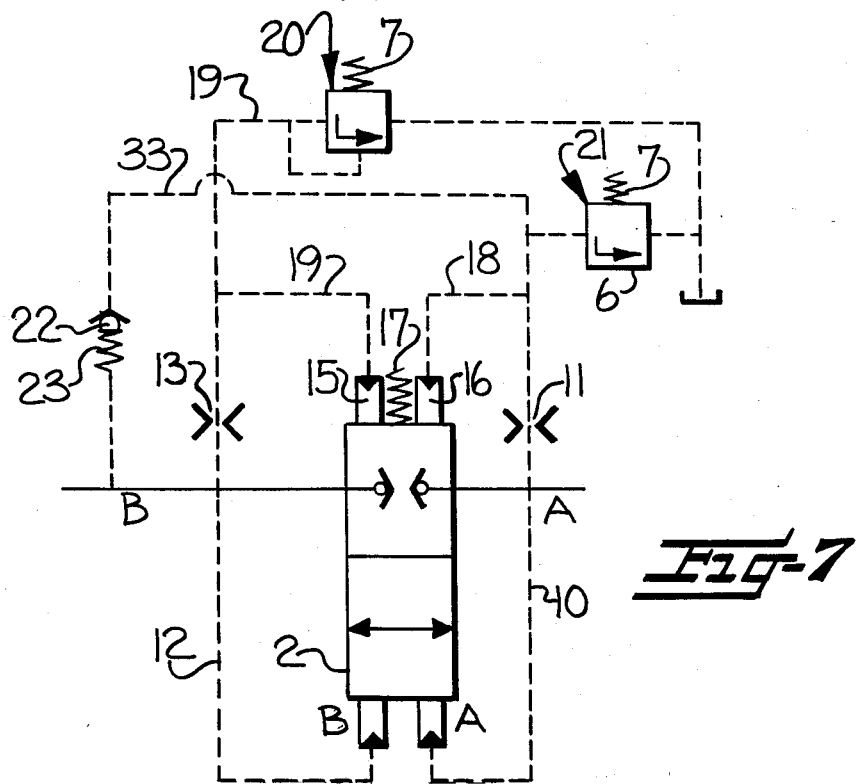

FIG. 6 is a view similar to FIG. 1, and illustrating a further embodiment of the invention; and, FIG. 7 is a circuit diagram of still another embodiment of the invention Referring more particularly to the drawings, there is disclosed in FIG. 1 a pilot operated pressure relief valve in accordance with the present invention, and which comprises a housing 30 having a bore therein, with the bore having inner and outer ends and an outwardly facing annular shoulder 31 intermediate its ends to define an inner cylindrical bore portion and an outer cylindrical bore portion which has a diameter greater than that of the inner bore portion.

A first or inlet fluid channel A coaxially communicates with the outer end of the bore, and a second or outlet fluid channel B radially communicates with the outer end of the bore.

A piston 1 is slideably mounted in the bore, and comprises a cylindrical central portion 4 which is closely received in the outer bore portion, and a cylindrical inner end portion 3 which is coaxially fixed to the central portion so as to define an inwardly facing annular shoulder 32 at the juncture thereof, and such that the shoulder 32 of the piston oppositely faces the shoulder 31 of the bore. The inner end portion 3 of the piston is closely received in the inner bore portion, and has an inner end which faces the inner end of the bore. The piston further includes a cylindrical outer end portion 2 coaxially fixed to the central portion 4, with the outer end portion 2 having a diameter which generally corresponds to that of the inner end portion 3.

The piston is slideably mounted in the bore for movement between a closed position as seen in FIG. 1, and wherein the outer end portion 2 closes the fluid channel A. The piston is movable to a raised open position which permits communication between the first and second fluid channels A and B in the manner further described below.

The space between the inner end of the bore and the inner end of the inner end portion 3 of the piston defines a first control space 16, and the space between the outwardly facing shoulder 31 of the bore and the oppositely facing shoulder 32 of the piston defines a second control space 15. A first fluid canal 10 extends coaxially through the piston, and includes a damping restriction 11, and thereby provides communication between the fluid channel A and the first control space 16. Also, there is provided a second fluid canal 12 which extends axially through the piston, and which includes a damping restriction 13, for providing communication between the second fluid channel B and the second control space 15. A helical coil spring 17 is disposed between the inner end of the bore and the inner end of the piston, for biasing the piston downwardly toward its closed position.

The valve of the present invention further comprises pressure release means operatively communicating with each of the first and second control spaces 16 and 15 for releasing the pressure in each of the spaces upon the pressure therein exceeding a predetermined amount. In the embodiment of FIG. 1, the pressure release means takes the form of a pressure relief outlet 14, a first duct 18 communicating between the first control space 16 and the outlet 14, and a first adjustable pressure operated relief valve means 21 disposed in the first duct 18. Also, a second duct 19 communicates between the second control space 15 and the pressure relief outlet 14, and a second adjustable pressure operated relief valve means 20 is disposed in the second duct 19.

The valve means 21 comprises a conical valve 6 adapted to seat in the duct 18, with the valve 6 being biased downwardly to a closed position by the spring 7. The force exerted by the spring 7 may be adjusted and preset by means of the threaded control member 9. By presetting the force of the spring 7, the pressure in the control space 16 at which the valve 6 releases may also be predetermined, and the fluid passing out of the system via the valve 6 and outlet 14 is removed at essentially zero pressure. The valve means 20 comprises a similar valve 5, spring 7, and threaded control member 8, by which the release pressure in the second control space 15 may be predetermined.

From the above, it will be apparent that the pilot operated relief valve as illustrated in FIG. 1 is adapted to control flow of a hydraulic fluid or the like from channel A to channel B, or alternatively from channel B to channel A. The control space 16 is pressurized via the canal 10 and damping restriction 11 with the pressure existing in the channel A, and the control space 15 is pressurized via the canal 12 and damping restriction 13 with the pressure existing in the channel B. As illustrated, the canals 10 and 12 extend axially through the piston 1, but alternatively, the canals could be designed to extend through the housing. Also, the effective piston areas in the control spaces 15 and 16 may be equal in size, or they may be somewhat different. The effective piston areas in the spaces 15 and 16 should not be significantly smaller than the effective piston areas which are exposed to the channels B and A respectively. In the embodiment illustrated, these corresponding effective areas are substantially equal in size.

For a working system wherein the fluid flows in a direction from A to B, the pressure in channel A will be higher than in channel B. The control space 16 is pressurized with the higher pressure of the channel A via the axial canal 10, and as long as the control valves 5 and 6 are seated, the control piston 1 is pressure balanced, while the spring 17 acts to bias the piston 1 into its seat against the channel A. As the pressure in channel A and the control space 16 increases, and exceeds the force of the spring 7 acting on the valve 6, the valve 6 will unseat, and the fluid will flow outwardly to the relief outlet 14, resulting in a pressure drop in the control space 16 by reason of the damping restriction 11 in the canal 10. The piston thus is no longer balanced, and its lower end portion 2 unseats from the channel A and opens communication to the channel B, until by a balancing process between channels A and B a new equilibrium position for the piston 1 and valve 6 is reached. A special advantage is provided by the fact that the control space 15, together with the axial canal 12 and damping restriction 13, will act as an attenuating system, since displacement of the fluid from space 15 via the restriction 13 is possible only in a controlled manner.

Where the working fluid flows in a direction from channel B to channel A, the pressure in channel B will be higher, and this pressure is transmitted via the axial canal 12 and damping restriction 13 to the control space 15. The lower pressure of channel A is established in the space 16. As long as the control valve 5, under the force of the spring 7, remains seated, the piston 1 is pressure balanced, and is biased by the spring 17 into its seated position blocking communication between the channels B and A. As the pressure in channel B exceeds a predetermined limit, which has been preset by adjustment of the threaded control 8, the valve 5 unseats, and the pressurized fluid exits from the control space 15 via relief duct 19 into the outlet 14. This causes the piston 1, and in particular its outer end portion 2, to unseat to the extent necessary to restore a new equilibrium position involving the valve 5 and the piston 1. In this case, an attenuation of the process results from the fact that as the main piston 1 begins to move, the fluid displaced from the space 16 must move through the axial canal 10 and the damping constriction 11.

Figure 3:
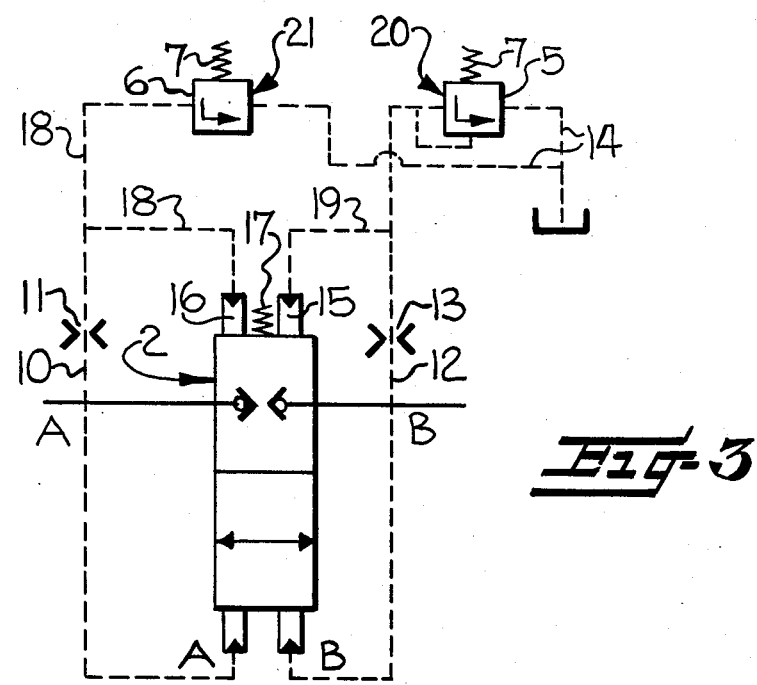
FIG. 3 is a schematic circuit diagram of the valve illustrated in FIG. 1.

FIG. 3 is a schematic circuit diagram of the embodiment of the invention illustrated in FIG. 1, with corresponding numerals.

In the embodiment shown in FIG. 2, which is also illustrated in the schematic circuit diagram of FIG. 4, there is illustrated a valve in accordance with the present invention and which acts as a relief valve for flow from channel B to channel A in the manner described above. In particular, there is provided a fluid passageway 33 which extends between the first control space 16 and the fluid channel B. In addition, the adjustable valve 21 has been replaced in this embodiment by a one-way check valve 22 in the passageway 33, which is provided with a weak spring 23, which provides for example a counter pressure of only about 0.2 bar. In this regard, it should be noted in the embodiment of FIG. 2, that while the adjustable valve 21 is omitted, such valve may also be present as is illustrated in the schematic circuit diagram of FIG. 7. Insofar as the valve 21 is present, it may be rendered inoperative by setting the force of the spring 7 to a high level.

Referring again to the embodiment of FIG. 2, and assuming a flow from channel A to channel B, there is provided a supply makeup of fluid from A to B upon the pressure in channel B reaching a predetermined low level. Such flow becomes necessary when by reason of a sudden consumption decrease of the working unit, a possibility of vacuum conditions arises in the channel B, or when an essentially non-pressurized supply makeup of fluid is necessary to a prepressurized working unit which operates under its own power. The excess pressure existing in channel A cannot transmit itself into the space 16 since the valve 22 is weakly loaded. Thus the piston 1 is not pressure balanced, and it will proceed to open, admitting passage from channel A to channel B. This movement is attenuated by the outflow of the fluid from the control space 15 via the axial canal 12 and damping constriction 13. Thus a transport of pressure fluid occurs from channel A to channel B which is proportional to the pressure differential provided by the spring 17. The one-way check valve 22 can also be designed as an integral component of the piston 1.

FIG. 5 illustrates an embodiment wherein the pressure release means comprises a two-way valve 24 which is connected via the ducts 18 and 19 to the pilot control spaces 16 and 15. The two-way valve 24 thus takes the place of the separate adjustable valves 20 and 21 of the embodiment of FIG. 1. Again referring to FIG. 5, there is further provided a common adjustable valve 25 which is positioned in the relief outlet. A further non-illustrated embodiment could be provided by replacing the separate valves 20 and 21 with either one or two solenoid operated pressure control valves, and which would permit the switching of the flow direction between the channels A and B in a controlled manner.

FIG. 6 illustrates still another embodiment of the pressure release means of the present invention. As shown in this figure, the two conical valves 5 and 6 are each held in position by a biasing spring 7, and a common pressure plate 26 contacts each of the springs. The pressure plate is in turn engaged by an adjustable threaded control member 8. By this arrangement, a single control member permits the simultaneous adjustment of both valves 5 and 6 at the same release level.

In a further non-illustrated embodiment, the two pilot valves 5 and 6 may be axially aligned, and biased into their respective seats by a common spring. By adjusting the location of one seat with respect to the other, it is possible to establish the predetermined release pressure. In this embodiment, it is also possible that a simultaneous setting of both release pressures is possible.

In the drawings and specification, there has been set forth a preferred embodiment of the invention, and although specific terms are employed, they are used in a generic and descriptive sense only and not for purposes of limitation.

That which is claimed is:

1. A pilot operated relief valve comprising
   a housing having a bore therein, said bore having inner and outer ends and an outwardly facing annular shoulder intermediate its ends to define an inner cylindrical bore portion and an outer cylindrical bore portion which has a diameter greater than that of said inner bore portion,
   a first fluid channel and a second fluid channel each conmunicating with said bore,
   a piston slideably mounted in said bore and comprising a cylindrical first portion which is closely received in said outer bore portion, and a cylindrical inner end portion closely received in said inner bore portion, and an inwardly facing annular shoulder between said first and second cylindrical portions, said piston being slideably mounted in said bore between a closed position wherein said piston closes communication between said first and second channels and an open position wherein said piston permits such communication, and wherein the space between the inner end of said bore and the inner end of said second cylindrical portion of said piston comprises a first control space, and the space between the shoulder of said bore and the shoulder of said piston defines a second control space,
   first fluid canal means for conducting a fluid from one of said fluid channels to said first control space,
   second fluid canal means for conducting a fluid from the other of said fluid channels to said second control space, and
   pressure release means operatively communicating with each of said first and second spaces for releasing the pressure in each of said spaces upon the pressure therein exceeding a predetermined absolute amount, said pressure release means comprising a pressure relief outlet maintained at essentially zero pressure, a first relief duct communicating with said first control space, a second relief duct communicating with said second control space, two-way valve means operatively connected to each of said first and second relief ducts for permittigg flow from only one of said first and second relief ducts to said pressure relief outlet, and pressure operated relief valve means disposed in said pressure relief outlet.

2. The pilot operated relief valve as defined in claim 1 wherein each of said first and second fluid canal means comprises a canal extending axially through said piston, with each of said canals including a damping restriction.

3. The pilot operated relief valve as defined in claim 1 further comprising spring biasing means, for biasing said piston toward its closed position.

* * * * *